United States Patent Office 2,954,405
Patented Sept. 27, 1960

2,954,405

AUTOXIDATION PROCESSES USING METAL PHTHALOCYANINES AS CATALYSTS

Heinrich Hock and Heinz Kropf, Clausthal-Zellerfeld, Germany, assignors to Ruhrchemie Aktiengesellschaft, Oberhausen-Holten, Germany No Drawing. Filed Feb. 14, 1955, Ser. No. 488,149

Claims priority, application Germany Feb. 17, 1954

9 Claims. (Cl. 260—610)

This invention relates to improvements in autoxidation.

The autoxidation process is used for the production of organic hydroperoxides. In accordance with this process, reactive organic compounds, particularly suitable hydrocarbons, are contacted with molecular oxygen at elevated temperatures. Salts or oxides of the heavy metals, such as copper (I) chloride, lead dioxide, lead naphthenate, and similar compounds are used in order to catalytically accelerate the oxidation. These catalysts, however, in addition to accelerating the formation of the hydroperoxides, cause a more or less extensive decomposition of peroxides resulting in a partial formation of secondary products, such as alcohols, ketones or aldehydes.

The main object of the autoxidation, however, is the formation of the peroxide. Thus, for example, in the autoxidation of cumene, the primary object is the following reaction:

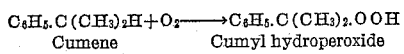
Cumene      Cumyl hydroperoxide

In addition to this reaction, however, the following undesirable side reactions also occur to a greater or lesser extent:

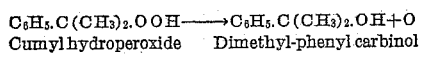
Cumyl hydroperoxide    Dimethyl-phenyl carbinol

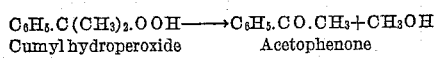
Cumyl hydroperoxide    Acetophenone

These secondary reactions increase with the peroxide concentration in the course of the autoxidation, and additionally increase when a higher temperature is used. For this reason it is not practical to obtain peroxide concentrations of more than 15% without additionally obtaining inadmissably large quantities of the secondary products. In the production of hydroperoxides from reactive carbon compounds, such as cumene, ethyl benzene and similar aromatics by autoxidation, in the past no catalysts were available which would not have a decomposing action on the peroxides formed.

One object of this invention is a catalyst for accelerating the autoxidation process without the above-mentioned disadvantages.

A further object of this invention is the effecting of the autoxidation process with the controlled production of desired organic compounds, such as carbinols, ketones, or acids. These, and further objects, will become apparent from the following description.

It has now been found that the production of organic hydroperoxides by autoxidation can be carried out with particular advantage if small amounts of a phthalocyanine are added to the reaction mixture to accelerate the reaction to be effected with molecular oxygen. Phthalo-cyanines are metal compounds which contain the metals in the complex form of linkage (see, for example, P. Karrer, "Lehrbuch der organischen Chemie" (1948, pages 826–827)).

Phthalo-cyanines which are suitable for the process of the invention contain metals of groups 1 to 3 of the periodic system, such as copper, magnesium, zinc or aluminium. Phthalo-cyanines of nickel, palladium, or platinum may also be used. It is expedient to use about 0.5 millimol of phthalo-cyanine per mol of hydrocarbons. It is also possible to use 0.2 to 0.3% by weight of phthalo-cyanines based on hydrocarbon. With higher concentrations there exists the danger of a decomposition. With lower amounts of phthalo-cyanine, the peroxide formation cannot be accelerated in the manner desired.

It is possible by means of the process of the invention to process the hydroperoxides of hydrocarbons and other organic compounds which contain at least one aromatic nucleus. It is possible, for example, to process benzene or tetrahydronaphthalene and benzene derivatives or tetrahydronaphthalene derivatives, naphthalene or naphthalene derivatives into hydroperoxides. The process of the invention is particularly well suited to compounds of the general formula:

in which R and $R_1$ represent a member of the group consisting of aliphatic radicals, aromatic radicals, substituted aromatic radicals, hydroaromatic radicals and hydrogen, and Ar is a substituted or unsubstituted aromatic radical. Cumene, p-nitrocumene, p-xylene, ethyl benzene, diphenyl methane and p-cymene can for instance well be converted into hydroperoxides with the process of the invention.

It is of particular advantage if, in addition to phthalo-cyanine, small amounts of hydroperoxides, especially hydroperoxides of the type which form in the autoxidation being carried out, are added to the reaction mixture. Sometimes it is also of advantage to add weakly alkaline or amphoteric materials such as alumina, magnesia, and/or similar compounds. In the autoxidation of cumene and other benzene hydrocarbons, it may be of advantage to add cumyl hydroperoxide, p-cumyl hydroperoxide, caustic soda solution or alumina.

The formation of peroxides can be highly accelerated with phthalo-cyanine or mixtures of phthalo-cyanines and hydroperoxides without the occurrence of undesirable secondary reactions. Under these circumstances, hydroperoxides are practically exclusively obtained, even if the concentration of the same in the reaction product of the autoxidation increases to, for example, 25% or even more.

A further advantage obtained with the use of the catalysts of the invention is a permissible increase of the reaction temperature of the autoxidation. To avoid decompositions, temperatures of only 70–80° C. were previously used. Higher temperatures may now be used without these disadvantages in order to increase the reaction rate. The reaction temperatures are dependent upon the hydrocarbon being processed, the finished product desired, and the phthalo-cyanine used. When processing cumene into cumyl hydroperoxide with the use of copper-phthalo-cyanine, the temperature may be increased to 105° C. When using zinc phthalo-cyanines, a maximum temperature of 115° C. is even possible. If cumene is to be processed into dimethyl-phenyl carbinol by the process of the invention, a temperature of 55° C. must not be exceeded when using manganese phthalo-cyanines. For the production of acetophenone from cumene with the use of cobalt-phthalo-cyanine, temperatures of 220° C. and still higher temperatures are possible. When processing p-xylene into p-xylyl hydroperoxide with the use of copper-phthalo-cyanine, the temperature may be increased up to 95° C. If p-xylene is to be converted into p-toluic acid with the use of cobalt-phthalo-cyanines, temperatures of 135° C. and still higher temperatures may be used.

The reaction may be effected at normal atmospheric pressure or at superatmospheric pressures. In a single passage, 10 to 30% of the oxygen used is combined as hydroperoxide. The uncombined oxygen is recycled. If, for example, 120 grams of cumene (1 mol) are to be converted into hydroperoxides, a total of 24 normal liters of oxygen is required. The complete autoxidation of cumene takes about 25 hours. For this purpose, 3 to 10 liters of oxygen are passed through per hour although only about 1 normal liter of oxygen is absorbed per hour. When passing through the oxygen, best results are obtained in accordance with the invention when using three times to ten times the quantity of oxygen to be absorbed.

The favorable catalytic action of the phthalo-cyanines is probably due to the type of linkage of the metals existing in these compounds. In the catalyst hitherto used for the production of hydroperoxides, the metal was linked by heteropolar principal valences. In the phthalo-cyanines, there is, in addition, the coordinative linkage. It is significant in this connection that metals such as magnesium or zinc, which, as oxides or salts, exert no catalytic action in the autoxidation, are good catalysts when in the form of corresponding phthalo-cyanines. When in the form of the phthalo-cyanines, the character of the metal apparently recedes into the background. Other metals, which, in the inorganic form of linkage, are likewise inapplicable to the autoxidation, show, when in the form of phthalo-cyanines, a considerable catalytic effect on the reaction with the formation of undesirable secondary products being largely reduced.

Phthalo-cyanines of other metals, such as nickel-phthalo-cyanines, copper-phthalo-cyanines, and manganese-phthalo-cyanines, also show a comparably favorable behavior. Although, when these compounds are used, undesirable secondary products cannot be completely avoided, their formation is extremely reduced as compared with the hitherto used catalysts, such as lead oxide. The result of the very high catalytic effectiveness of these metal compounds, in connection with a low reaction temperature of the autoxidation, is such that high concentrations of peroxide can be obtained with the portion of secondary products nevertheless remaining low. The yields otbainable in accordance with the invention may be considerably increased when using phthalo-cyanines of as high as possible a purity. Best results are obtained if phthalo-cyanines are used the purity of which is sufficient for analytical purposes.

The purification in the known process for the production of phthalo-cyanines (see Gattermann-Wieland "Die Praxis des organischen Chemikers," page 302 (1947)) according to which the raw products obtained by melting together a chloride of a bivalent metal, phthalic acid and urea are alternately boiled with dilute hydrochloric acid and dilute caustic soda solution is not sufficient for this purpose. Phthalo-cyanines of adequate purity are obtained, however, by dissolution of the raw product in concentrated sulfuric acid, filtration, if so required, dilution of the solution to a content of acid of about 10% by volume, and boiling the precipitated dye with dilute caustic soda solution, water, and, finally, with alcohol. Less stable phthalo-cyanines may be treated with hot dilute sulfuric acid, then with cold dilute caustic soda solution, hot water, and, finally, with alcohol.

When using a copper complex purified in this manner, it is possible to convert cumene at 105° C. into the hydroperoxide with an hourly conversion of 3.9% without the occurrence of a decomposition. As compared with the incompletely purified complex salt, the conversion is not only increased by 50%, but a formation of dimethyl-phenyl carbinol and acetophenone is completely avoided. Similar conditions are also obtainable when using the zinc compound.

Some organic compounds, such as substituted hydrocarbons, with the use of which it was not previously possible to obtain a hydroperoxide by autoxidation, can smoothly be converted into the corresponding hydroperoxides when operating in the presence of pure phthalo-cyanines. Thus, it was possible in this manner to produce for the first time p-nitrocumene hydroperoxide from p-nitrocumene, which is completely unaffected by other "accelerators," such as lead dioxide and bivalent lead palmitate. By an acid cleavage of this peroxide there is formed p-nitrophenol and acetone in a smooth reaction.

It is even possible with the use of very pure phthalo-cyanines, to obtain secondary products of the hydroperoxides. In the autoxidation of cumene, for example, dimethyl-phenyl carbinol and acetophenone are formed as side products. These secondary products may possibly be very desirable. However, it is of importance in this case to direct the autoxidation so that only one of the potential secondary products is formed, if possible. It is possible in accordance with the invention to direct the autoxidation of cumene in such a manner that dimethyl-phenyl carbinol is almost exclusively formed by operating at a reaction temperature of about 65° C. and using bivalent manganese phthalo-cyanine as the catalyst with the addition of alkali. By cleaving off water after or during the reaction, α-methyl styrene is obtained, which is very desirable for polymerizations.

It is also possible to obtain acetophenone as the main product from cumene when using cobalt-phthalo-cyanine, and operating at temperatures above 150° C., i.e., above the boiling point of cumene. In this case it is expedient to operate either under superatmospheric pressure or in the gaseous phase. The processing of cumene may be conducted in the same direction, although with a somewhat lower efficiency, when using the bivalent iron complex.

P-xylene, when processed with cobalt-phthalo-cyanine under similar conditions, i.e., at 135° C., yields exclusively p-toluic acid. This acid may directly be further oxidized to form terephthalic acid. This conversion is expediently effected under superatmospheric pressure and at elevated temperature. Esters of p-toluic acid may also be converted in this manner, using temperatures of above 250° C.

The production of terephthalic acid in accordance with the invention may be effected in two stages. In the first stage, p-xylene is oxidized with oxygen to form p-toluic acid while using the conventional heavy metal catalysts. In this reaction, cobalt-phthalo-cyanine is distinctly superior to other cobalt compounds. For example, the cobalt-phthalo-cyanine compound used in accordance with the invention works considerably better than the oxide, acetate, palmitate, resinate or p-toluilate of cobalt.

In the second stage, the p-toluic acid obtained is converted into terephthalic acid. This is generally also effected by a catalytic autoxidation or by an oxidation carried out, for example, with potassium permanganate. The operation of the second stage in accordance with the invention requires an esterification which, just as the saponification of the terephthalic acid-monoester, may be effected in columns filled with ion exchangers. It serves to increase the boiling point and also to reduce the influence which may be caused by the acid carboxyl group.

The following examples are given by way of illustration and not limitation:

*Example 1*

120 grams of cumene were mixed with 1 gram of cumene hydroperoxide and 0.3 gram of magnesium-phthalo-cyanine and then intimately mixed with oxygen by continuous stirring at a temperature of 105° C. in a stirring vessel. After 10 hours, the content of peroxide amounted to about 40.5% corresponding to a rate of conversion of the hydrocarbon of about 3.3% per hour.

At a temperature of only 80° C. the peroxide concentration reached only about 20%, and the rate of conversion of the hydrocarbon was only about 1.6% per hour.

Side products were not formed in either case.

*Example 2*

120 grams of cumene were mixed with 0.3 gram of copper-phthalo-cyanine and 1 gram of cumene hydroperoxide, and the mixture was intimately mixed with oxygen at a temperature of 80° C. in a stirring vessel. After 10 hours, the peroxide content was about 32% corresponding to a rate of conversion of the hydrocarbon of about 2.6% per hour. 9 parts of decomposition products (dimethyl-phenyl carbinol and acetophenone) had been formed for every 91 parts of hydroperoxide.

*Example 3*

120 grams of cumene were mixed with 0.3 gram of copper-phthalo-cyanine of the highest possible purity and 1.5 grams of cumene hydroperoxide. The mixture was intimately mixed with oxygen by continuous stirring at a temperature of 105° C. in a stirring vessel. After 10 hours, the peroxide content was about 49% corresponding to a rate of conversion of the hydrocarbon of about 3.9% per hour. There was no formation of side products.

*Example 4*

55 grams of p-nitrocumene were mixed with 0.1 gram of copper-phthalo-cyanine of the highest possible purity and 0.5 gram of cumene hydroperoxide. The mixture was intimately mixed with oxygen by continuous stirring at a temperature of 105° C. in a stirring vessel. After 10 hours, p-nitrocumene hydroperoxide (melting point 41° C.) in amount of 2.9 grams corresponding to a conversion of 4.9% per hour, was recovered via the sodium salt.

By splitting off acid as, for example, with catalytic quantities of perchloric acid, 2 grams of peroxide yielded 1.3 grams of p-nitrophenol corresponding to 92.1% of the theoretically possible yield.

*Example 5*

120 grams of cumene were mixed with 0.3 gram of bivalent manganese phthalo-cyanine of the highest possible purity, 1.5 grams of cumene hydroperoxide and 20 grams of 50% caustic soda solution. The mixture was intimately mixed with oxygen by continuous stirring at a temperature of 65° C. in a stirring vessel. After 10 hours, dimethyl-phenyl carbinol in amount of 59.7 grams corresponding to a conversion of 43.9%, 0.5 gram cumene hydroperoxide and 1.6 grams acetophenone were separated from the reaction mixture.

*Example 6*

120 grams of cumene were mixed with 0.3 gram of cobalt-phthalo-cyanine of the highest possible purity and the mixture was intimately mixed with oxygen by continuous stirring at a temperature of 150° C. in a stirring vessel with reflux. After 5 hours, 70.6 grams of acetophenone and 35.7 grams of dimethyl-phenyl carbinol were separated from the reaction mixture. A total of 85% of the hydrocarbon was converted, about 70% thereof into acetophenone and about 30% into dimethyl-phenyl carbinol.

*Example 7*

106 grams of p-xylene were mixed with 0.3 gram of cobalt-phthalo-cyanine of the highest possible purity and intimately mixed with oxygen by continuous stirring at a temperature of 135° C. in a stirring vessel. After 10 hours, the unconverted hydrocarbon was distilled off. The residue consisted of 52.6 grams of p-toluic acid (melting point 180° C.). This corresponded to a conversion of 38.7%.

*Example 8*

96 grams of p-toluic acid-n-butyl ester were mixed with 0.15 gram of cobalt-phthalo-cyanine of the highest possible purity and intimately mixed with oxygen by continuous stirring at a temperature of 260° C. in a stirring vessel. After 5 hours, terephthalic acid-mono-n-butyl ester in amount of 13.1 grams corresponding to a conversion of 11.4% was separated from the reaction mixture.

*Example 9*

106 grams of p-xylene were mixed with 0.3 gram of copper-phthalo-cyanine of the highest possible purity and 1.5 grams of cumyl hydroperoxide. The mixture was intimately mixed with oxygen by continuous stirring at a temperature of 95° C. in a stirring vessel. After 10 hours, the peroxide content amounted to 3.5% which corresponded to a conversion of the hydrocarbon of 2.54%. No side products had formed.

*Example 10*

106 grams of ethyl benzene were mixed with 0.3 gram of copper-phthalo-cyanine of the highest possible purity and 1.5 grams of cumyl hydroperoxide. The mixture was intimately mixed with oxygen by continuous stirring at a temperature of 100° C. in a stirring vessel. After 10 hours, the peroxide content amounted to 5.5% which corresponded to a conversion of the hydrocarbon of 3.92%. No side products had formed.

*Example 11*

168 grams of diphenyl methane were mixed with 0.3 gm. of copper-phthalo-cyanine of the highest possible purity and 1.5 grams of cumyl hydroperoxide. The mixture was intimately mixed with oxygen by continuous stirring at a temperature of 100° C. in a stirring vessel. After 10 hours, the peroxide content amounted to 12.5% which corresponded to a conversion of the hydrocarbon of 1.08% per hour. On distillation of the hydrocarbon, a residue of 1.68% of tetraphenyl ethane remained.

*Example 12*

134 grams of p-cymene were mixed with 0.3 gram of copper-phthalo-cyanine of the highest possible purity and 1.6 grams of p-cumyl hydroperoxide. The mixture was intimately mixed with oxygen by continuous stirring at a temperature of 105° C. in a stirring vessel. After 10 hours, the peroxide content amounted to 20.5% which corresponded to a rate of conversion of the hydrocarbon of 1.69% per hour. The hydroperoxide obtained was p-methyl-cumyl hydroperoxide. No side products had formed.

*Example 13*

120 grams of cumene were mixed with 0.3 gram of zinc-phthalo-cyanine of the highest possible purity and 1.5 grams of cumyl hydroperoxide. The mixture was intimately mixed with oxygen by continuous stirring at a temperature of 115° C. in a stirring vessel. After 10 hours, the peroxide content amounted to 44.3% which corresponded to a rate of conversion of the hydrocarbon of 3.71% per hour. No side products had formed.

We claim:

1. A process for the oxidation of an organic compound for the production of organic hydroperoxides in which a hydrocarbon having the structural formula

$$\text{Ar} - \underset{R}{\underset{|}{\overset{R_1}{\overset{|}{C}}}} - H$$

in which R and $R_1$ represent a member selected from the group consisting of saturated aliphatic radicals, unsubstituted aromatic radicals, and hydrogen and Ar represents a substituent selected from the group consisting of unsaturated aromatic radicals and saturated aliphatic-substituted aromatic radicals is contacted with molecular oxygen at an elevated temperature, the improvement which comprises effecting said contacting at a temperature above 65° and below 135° C. in the presence of 0.2 to 0.3% by weight of a phthalocyanine of a metal selected from the group consisting of nickel, palladium, platinum, magnesium, zinc, copper and manganese.

2. Improvement according to claim 1, in which said phthalocyanine is analytically pure phthalocyanine.

3. Improvement according to claim 1, in which said contacting is effected in the presence of an alkaline material.

4. Improvement according to claim 1, in which said contacting is effected in the presence of a member selected from the group consisting of alumina and magnesia.

5. Improvement according to claim 1, in which said contacting is effected at elevated pressure.

6. Improvement according to claim 1, in which said contacting is effected at a temperature of at least about the boiling point of the compound being oxidized.

7. Process according to claim 1, in which said contacting is effected in the added presence of a hydroperoxide.

8. Improvement according to claim 7, in which said hydroperoxide is a hydroperoxide corresponding to the hydroperoxide produced by the autoxidation.

9. In the process for the production of cumene peroxide by the autoxidation of cumene, in which cumene is contacted with molecular oxygen at elevated temperature, the improvement which comprises effecting said contacting in the presence of a substantially pure phthalo-cyanine selected from the group consisting of magnesium-phthalo-cyanine, zinc-phthalo-cyanine, copper-phthalo-cyanine, and nickel-phthalo-cyanine.

References Cited in the file of this patent

UNITED STATES PATENTS

| | | |
|---|---|---|
| 2,548,435 | Lorand et al. | Apr. 10, 1951 |
| 2,718,530 | Conner | Sept. 20, 1955 |

FOREIGN PATENTS

| | | |
|---|---|---|
| 1,118,040 | France | Mar. 5, 1956 |

OTHER REFERENCES

Cook: Jour. Chem. Soc. London (1938), pages 1778–80 (3 pages).